United States Patent [19]
Kotzin et al.

[11] Patent Number: 5,231,629
[45] Date of Patent: Jul. 27, 1993

[54] FULL-DUPLEX COMMUNICATION SYSTEM

[75] Inventors: Michael D. Kotzin, Buffalo Grove, Ill.; Anthony van den Heuvel, Surrey, United Kingdom

[73] Assignee: Motorola, Inc., Schaumburg, Ill.

[21] Appl. No.: 591,302

[22] Filed: Oct. 1, 1990

[51] Int. Cl.$^5$ ............................................. H04L 5/14
[52] U.S. Cl. ...................................... 370/26; 370/24; 370/97; 375/4; 379/344
[58] Field of Search ..................... 370/24, 26, 27, 29, 370/32, 32.1, 50, 62, 68, 68.1, 70, 75, 95.1, 95.3, 97, 110.1, 118; 379/59, 60, 406, 410, 411, 338, 339, 341, 342, 343, 344; 455/33, 34, 53, 54, 56, 7; 375/3, 4

[56] References Cited

U.S. PATENT DOCUMENTS

| | | | |
|---|---|---|---|
| 3,693,088 | 9/1972 | Rustako, Jr. et al. | 455/52 |
| 3,828,146 | 8/1974 | Lewis | 370/62 |
| 3,835,259 | 9/1974 | Medill et al. | 370/62 |
| 3,898,390 | 8/1975 | Wells et al. | 379/59 |
| 3,906,166 | 9/1975 | Cooper et al. | 379/60 |
| 3,997,730 | 12/1976 | Stidham | 370/62 |
| 4,049,920 | 9/1977 | Knollman | 370/62 |
| 4,162,376 | 7/1979 | Hirschmann et al. | 370/62 |
| 4,556,760 | 12/1985 | Goldman | 379/60 |
| 4,604,740 | 8/1986 | Gandini et al. | 370/27 |
| 4,658,435 | 4/1987 | Childress et al. | 370/95.1 |
| 4,696,027 | 9/1987 | Bonta | 379/60 |
| 4,754,450 | 6/1988 | Lynk, Jr. et al. | 370/29 |
| 4,766,606 | 8/1988 | Bardutz et al. | 370/26 |
| 4,870,408 | 9/1989 | Zdunek et al. | 370/95.1 |
| 4,942,570 | 7/1990 | Kotzin et al. | 370/68.1 |
| 5,025,442 | 6/1991 | Lynk et al. | 370/29 |
| 5,038,342 | 8/1991 | Crisler et al. | 370/95.1 |

OTHER PUBLICATIONS

Joseph D. Greenfield, "Practical Digital Design Using ICs", Oct. 1983, pp. 151–157.

*Primary Examiner*—Douglas W. Olms
*Assistant Examiner*—Alpus H. Hsu
*Attorney, Agent, or Firm*—Robert S. Babayi

[57] ABSTRACT

In a TDM communication system (100), full duplex communication is provided for two communication units(104) and (105) which communicated communication messages through a repeater (102). Communication messages transmitted from the communication units (104) and (105) are combined in the repeater (102) to produce a combined communication message. The repeater (102) transmits the combined communication message to the communication units (104) and (105). The communication units (104) and (105) remove from the combined communication message the communication the previously transmitted communication message so as to recover the communication message from the other communication unit.

12 Claims, 2 Drawing Sheets

5,231,629

FULL-DUPLEX COMMUNICATION SYSTEM

TECHNICAL FIELD

This invention relates generally to the field of radio frequency communication systems and in particular a communication system capable of providing full-duplex communication between two communication units.

BACKGROUND

Radio frequency (RF) communication systems that make use of time division multiplexing (TDM) are known. In such systems a communication frequency (or pairs of frequencies) is divided by time into frames and time slots, and a plurality of communication units are assigned time slots to support their communication needs. The communication units communicate their messages at their respective assigned time slots through a number of repeaters in conjunction with one central communication controller. To facilitate the channel assignment mechanism, such systems generally provide one or more dedicated control time slots that support the channel assignment and other control functions.

An important feature of a TDM radio communication system is the capability of providing full duplex communication between two communication units. In a conventional implementation of a full duplex TDM system, the repeater communicates communication messages with a first and a second communication unit on inbound channel and outbound RF channels. The first communication unit transmits, on the inbound channel, a communication message during a first assigned inbound time slot which is repeated by the repeater on the outbound channel and received by the second communication unit during a first assigned outbound time slot. The second communication unit transmits a communication message during a second outbound time slot and, likewise, this communication message is simultaneously repeated by the repeater and received by the first communication unit during a second inbound time slot. Thus, for each call, two outbound time slots and two inbound time slots of the repeater are utilized. A major problem with this arrangement is that the amount of inbound and outbound time slots, i.e. the spectrum, required for providing a full duplex communication system substantially limits the total system capacity for a given spectrum allocation, thereby restricting additional enhancing features to be incorporated in the system.

Therefore, a need exists to efficiently utilize the available spectrum and provide additional features or capacity for carrying out a full duplex communication between two communication units.

SUMMARY OF THE INVENTION

These needs and others are substantially met through provisions of the radio communication system disclosed herein.

Briefly, according to the invention, two communication units communicate with each other through a repeater by transmitting communication messages to the repeater. The repeater combines the communication messages and transmits a combined communication message to the communication units. The communication units receive the combined message and remove therefrom the communication message that was previously transmitted by them, thereby recovering the communication message of the other communication unit.

DETAILED DESCRIPTION OF THE PREFERRED EMBODIMENT

Figure 1:
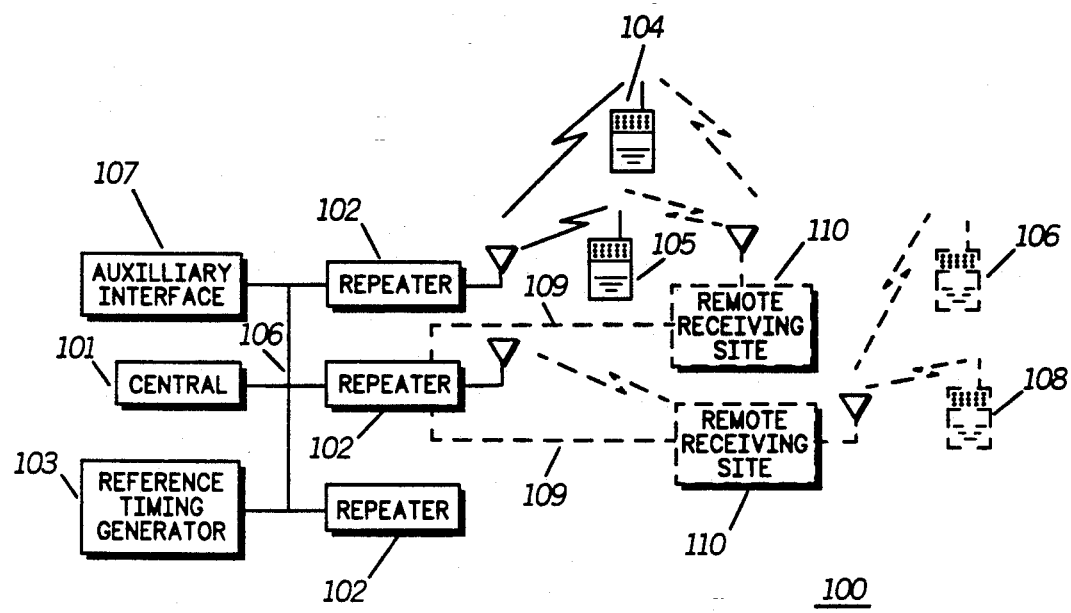
FIG. 1 provides a communication system block diagram.

Referring to FIG. 1, a TDM system implementing the principals of the invention can be seen as generally depicted by the numeral 100. The system (100) includes generally a central controller (101) that controls the allocation of communication channels, i.e. time slots, to promote organized communication between various communication units. The central controller (101) connects via appropriate interconnections, in a known manner, to a plurality of repeaters (102), there being one repeater (102) for each supported frequency (or frequency pair, depending upon the application). The central controller (101) controls the operation of the repeaters (102) and provides control channel information. Each repeater (102) may include a microprocessor and associated digital circuitry, in which case the controlling actions of the central controller (101) may take the form of data packets transferred over an interconnecting network (106).

The system also includes a reference timing generator (103) and one or more auxiliary interface units (107). The timing generator (103), which may include a high stability reference oscillator, provides various clock signals, including but not limited to the TDM frame clock, slot clock, and data bit clock, to the central controller (101) and the repeaters (102) to maintain time synchronization throughout the system so that symbols, time slots and frames on all frequencies coincide in time. The auxiliary interfaces (107) provide means to interconnect the system (100) with non-RF communication units, such as telephone lines and dispatch consoles.

The system 100 also includes a plurality of TDM capable communication units (104). (As used herein, "communication unit" is intended to refer to any of a variety of two-way radio platforms, including but not limited to mobile radios, portable radios, and fixed location radios).

Figure 2:
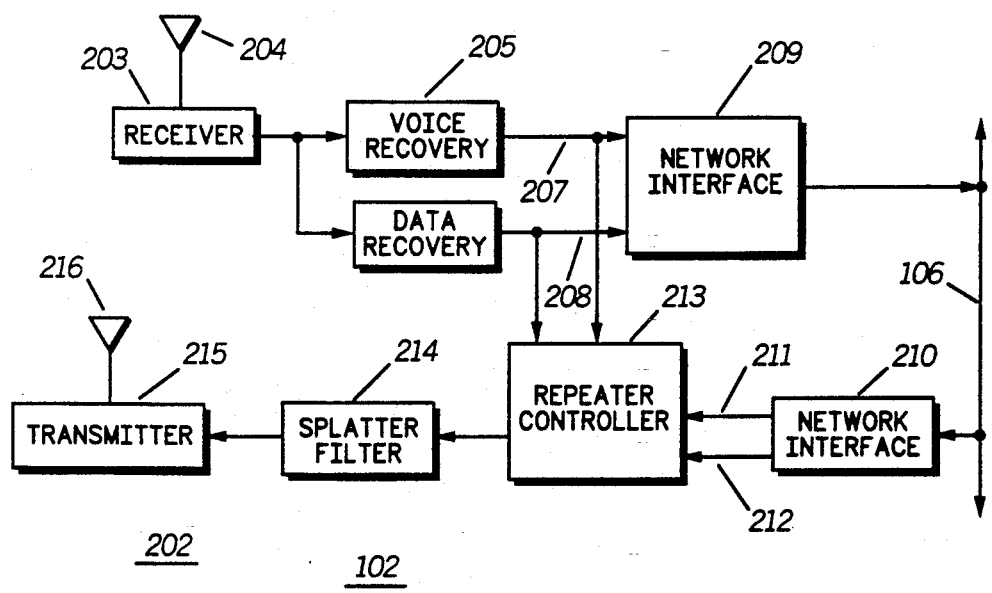
FIG. 2 comprises a block diagram depiction of a repeater.

Referring to FIG. 2, the repeater (102) will now be described. The repeater (102) includes a receive and a transmit section (201 and 202) and operates under the control of a repeater controller (213). The receiver section (201) includes an RF receiver (203) that receives inbound communication messages via an appropriate antenna structure (204) and that provides as its output a baseband signal. The latter signal is passed to both a voice recovery block (205) and a data recovery block (206). The voice recovery block processes the received baseband signal to recover the voice information signal (207). As is well known, this signal might represent some processed version of the original audio signal. Depending on the nature of the repeater interconnection network (106), the voice recovery block (205) may include an audio encoder/decoder to reformat the received voice signal (207). In the case of the aforementioned audio processing, this coding function could be accomplished with a digital signal processor, for example the Motorola DSP56000.

The data recovery block operates in a known manner to recover any data information (such as, for instance, control time slot information) included in the received signal, thus providing the received data signal (208). The recovered voice signal (207) and data signal (208) are passed to the repeater controller (213) as well as a repeater network interface (209) which communicate these communication messages to the central controller (101) or other repeaters (102) as is appropriate via the repeater interconnection network (106). So configured, the repeater (102) receives RF signals and properly processes them to recover both voice and data messages that may be present in the communication.

The transmitter section (202) also includes a network interface (210) that receives voice signals (211) and data signals (212) from the interconnecting network (106). The voice signals (211) comprise received voice signals (207) from the repeater's receiver section (201) or from the receiver sections (201) of other repeaters (102) in the system. The data signals (212) include control channel information from the central controller (101). The voice signal (211) and the data signal (212) are processed by the repeater controller (213) to provide an appropriately coded and time slot and frame synchronized signal in the form of communication messages at its output. It may be appreciated that the repeater controller (213) may comprise a DSP which in addition to general control of the repeater (102) operation also includes the capability of reformatting the voice signals (207) and (211) as appropriate for various receiving communication units (104) and (105). The output of the transmitter controller (213) is passed through a splatter filter (214) to an RF transmitter (215) that properly processes the communication messages to provide a signal that may be appropriately radiated from an antenna device (216) to cause transmission of the outbound communication messages.

Figure 3:
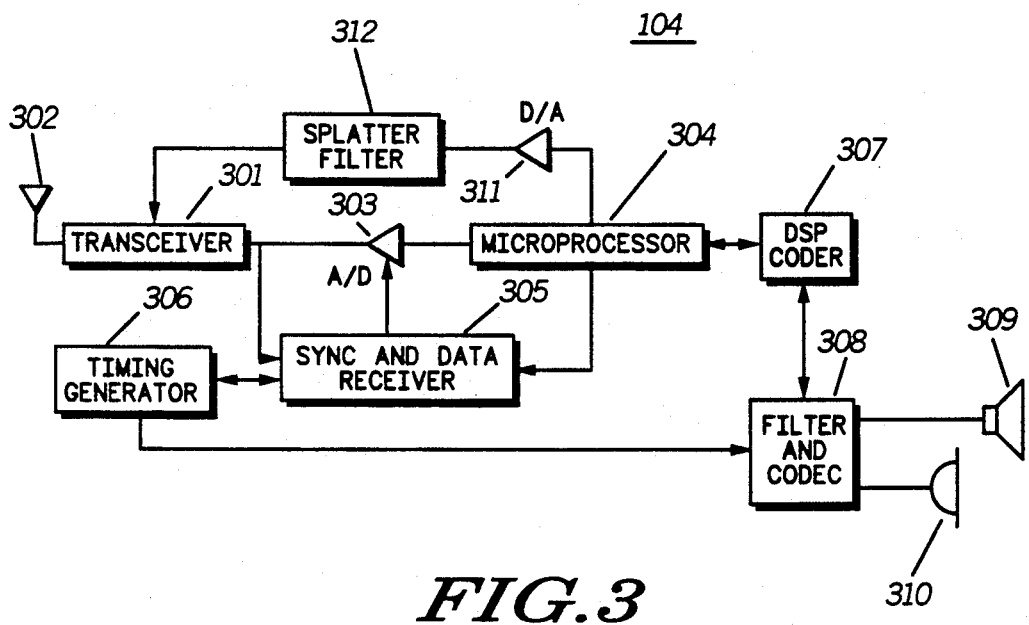
FIG. 3 comprises a block diagram depiction of a communication unit.

Referring to FIG. 3, a TDM capable communication unit (104) will be described. The communication unit (104) includes an RF transceiver (301) that couples to an appropriate antenna (302) to transmit and receive the inbound and outbound communication messages in the form of RF signals. The transceiver (301) provides a received baseband signal which is digitized by an analog to digital converter (303). The output of the A/D converter is passed to a microprocessor (304), such as, for example, the Motorola MC68000. The baseband signal is also passed to a sync and data recovery block (305) which processes the signal to establish frame and bit synchronization with the transmitting repeater (102). The communication unit also includes a clock generator (306) which provides timing signals as appropriate to support the TDM nature of the communication messages.

The microprocessor (304) processes the received communication messages and passes the audio information to a DSP coder (307), such as, for example, the Motorola DSP56000, which provides a coding/decoding function used in this embodiment to properly encode (or decode) the audio information in a particular form. In an alternate embodiment, the DSP (307) could also perform the functions provided by the microprocessor (304) and the sync and data recovery block (305), resulting in a reduction of hardware complexity. The coder/decoder (307) couples through a filter and coder (308) to an appropriate speaker (309) and microphone (310) to allow received audio information to be rendered audible and to allow originating audio information to be processed and transmitted.

Audio information to be transmitted is passed from the DSP (307) to the microprocessor (304) where additional information appropriate to the the TDM nature of the communication messages are added. The resulting signal, properly coded and time slot and frame synchronized, is passed in a digitized form to the digital to analog converter (311). The output of the D/A converter (311) is passed through a splatter filter (312) to the RF transceiver (301) which properly processes the signal to provide a signal that may be appropriately radiated from the antenna device (302) to cause transmission of the processed communication messages as desired.

Figure 4:
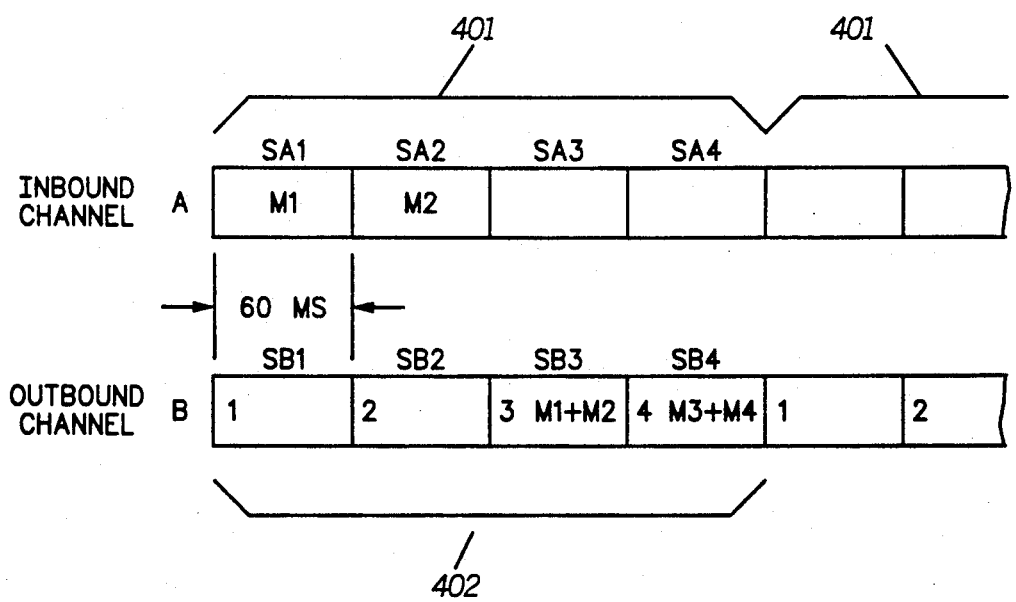
FIG. 4 comprises a timing depicting a message format used in the communication system of FIG. 1.

Referring to FIG. 4, the TDM message format of the above described system is shown. While certain limited applications could effectively use a single channel, the remaining discussion will describe the more general case wherein at least two frequency channels provide full-duplex communication between the communication units (104) and (105), and where each of the frequencies are divided into frames and time slots. As depicted, the two frequency channels comprise an inbound A channel and an outbound B channel, wherein each is divided into inbound and outbound frames 401, and 402. The inbound and the outbound frames are respectively subdivided into four time slot slots SA1-SA4 and SB1-SB4 which support communication of digital communication messages. The repeaters (102) utilize the inbound channel A for receiving inbound communication messages transmitted by the communication units (104) and (105). The outbound channel B is utilized for transmitting outbound messages to the communication units (104) and (105). It may be appreciated that the time slot assignments for the inbound communication messages may be allocated on time slots of two frequency channels.

The inbound and outbound communication messages may comprise control messages which are usually generated and received by the central (101) and are communicated to the communication units during a control time slots (not shown) and contain those information which support channel request and channel assignment functions. The inbound and outbound communication messages may comprise voice or data messages which are generated by the communication units and are communicated between the communication units (104) and (105) through the repeaters (102) when full duplex communication is established. Generally, the voice and/or data communication messages are not routed to the central controller during the communication.

Upon a full-duplex communication request, the central controller (101) assigns inbound and outbound time slots to the communication units (104) and (105) during which they may receive or transmit communication messages. For example, the communication unit (104) may be assigned to transmit inbound communication messages (M1) to the repeaters (102) on the inbound channel A during the time slot SA1. Likewise, the communication unit (105) may transmit an inbound message (M2) during a second assigned time slot SA2. The communication unit receives outbound communication messages from the repeaters (102) on the outbound channel B during any of the time slots assigned by the controller (101).

According to one embodiment of the invention, two communication units (104) and (105) within the communication system (100) may engage in full-duplex voice or data communication through one or more of the repeaters (102). After the full-duplex communication request has been processed, the communication messages (M1) and (M2) are transmitted by the communication units (104) and (105) respectively during the time slots SA1 and SA2. The repeater (102) upon reception of the communication messages (M1) and (M20 combines them to provide a combined communication message (M1+M2). In the preferred embodiment of the invention the communication messages (M1) and (M2) are combined by being deterministically bit by bit EX-ORed with each other. However, it may be appreciated that the communication messages (M1) and (M2) may be combined by other well known combination techniques. Although, a binary system is contemplated herein, the invention equally applies to multilevel or analog transmission by, for example, simple adding of channel symbols or wave forms. The combined communication message (M1+M2) is transmitted on the outbound channel B during a third time slot (SB3). The third time slot (SB3) is assigned by the central controller (101) as the outbound time slot during which the communication units (104) and (105) may receive communication messages from the repeaters (102). The communication units (104) and (105) after reception of the combined communication message (M1+M2) simultaneously remove the previously transmitted communication messages (M1) or (M2), i.e M1 is removed by the communication unit 104 and M2 is removed by the communication unit 105, thereby recovering each other's communicated communication message. That is, communication unit (104) recovers the communication message (M2) by removing the previously transmitted communication message (M1) from the combined communication message (M1+M2), and simultaneously therewith the communication unit (105) recovers the communication message (M1) by removing the previously transmitted communication message (M2) from the combined communication message (M1+M2). It may be appreciated that the removal of the previously transmitted communication messages from the combined messages (M1+M2) must of course be commensurate with the technique used when the communication messages were combined. Accordingly, in the preferred embodiment, the communication messages are recovered by EXORing the combined communication message (M1+M2) with the previously transmitted communication messages (M1) or (M2). As it can be seen from the above description, the outbound capacity of the communication system is doubled because only one outbound time slot, i.e. SB3, is used to transmit the outbound communication messages. This increased capacity may be utilized to enhance the system features of the communication system (100) by, for example, providing feedback of the performance information, such as bit error rate or similar information or additional data control or data information to the users.

According to another embodiment of the invention, the other additional outbound capacity provided by utilizing the principals of the present invention may be utilized to double the overall capacity of a communication system, especially a system which provides a wide area communication coverage. Referring back to FIG. 1, the communication system 100 may be modified to extend the inbound coverage by utilizing a number of geographically dispersed remote receiving sites (110) (shown in dotted lines). The remote receiving site (11) are coupled to the repeaters (102) through conventional landlines (109) or interconnecting means. The receiving sites (110) are located such that they provide for geographic re-use of the inbound channel A in such a way that simultaneous transmission by geographically dispersed communication units (104), (105), (106) and (108) does not cause communication interference. In this arrangement, two sets of communication units, i.e. set including communication units (104) and (105) and the set including communication units (106) and (108) may simultaneously transmit communication messages, on the inbound channel A, to the remote receiving sites (110) during their assigned time slots, SA1 and SA2, which effectively provides for doubling of the inbound communication capacity. The receiving sites (110) thereafter transmit the received communication messages to the repeater (102) through the connecting landlines (109). Corresponding communication messages are combined with each other by way of one of the above described techniques to generate two combined messages (M1+M2 and M3+M4). The two combined messages are transmitted from the repeaters directly to the communication units on the outbound channel B during a third and a fourth time slots (SB3) and (SB4). The combined messages are transmitted on the outbound channel B which are received by the communication units during their allocated time slot. As described above, the communication units thereafter remove the previously transmitted communication messages to recover the communication message of the other communication unit. In effect, the over all communication capacity of the communication system 100 is doubled by the doubling of the inbound capacity and the doubling of the outbound capacity due to the principals of the present invention such that two simultaneous full duplex communications may be handled by the communication system (100). The above technique for providing additional inbound capacity is particularly useful for portable communication units which are limited in the amount of transmitter power that they can provide.

It may be appreciated that commensurate with the system requirements, other existing variations of TDM message format may be used in the present invention, such as those utilizing a single frequency channel for both inbound and outbound communication. Additionally, the principals of the present invention may also be incorporated in a frequency division multiplexed (FDM) communication system. In one variation of such an FDM communication system, the communication messages are transmitted from well known FDM communication units on a first and a second frequency channel to a well known FDM repeater. The FDM repeater combines the communication messages and transmits the combined communication message on a third frequency. The FDM communication units thereafter remove the previously transmitted communication message from the combined communication message to recover the communicated message from the other communication unit. Accordingly, both TDM and FDM communication systems in addition to any and all applicable variations thereof are contemplated by the description of the present invention.

What is claimed is:

1. A method for communicating, on at least one radio frequency channel, communication messages between two communication unit through a repeater including the steps of:
 (a) transmitting binary communication messages from each of said communication units to said repeater;
 (b) EXORing said binary communication messages to provide a combined communication message and transmitting the combined communication message to said communication units;
 (c) receiving said combined communication message by at least one of the communication units; and
 (d) recovering the communication message of the other communication unit by EXORing the combined communication message with the binary communication message transmitted from that communication unit.

2. The method of claim 1 wherein said step (d) comprises recovering the communication message of the other communication unit by EXORing said combined binary communication message with the binary form of communication message transmitted by that communication unit.

3. A communication system for communicating, on at least one radio frequency channel, communication messages between at least two communication units through a repeater comprising:
 means for transmitting binary communication messages from each of said communication units to said repeater;
 EXORing means for combining said binary communication messages in said repeater;
 means for transmitting a combined communication message to said communication units;
 means for receiving said combined communication message in at least one of said two communication units; and
 means for recovering the communication message of the other communication unit by EXORing the combined communication message with the communication message transmitted from said communication unit.

4. The system of claim 3, wherein said means for recovering comprises means for EXORing said combined binary communication message with the binary form of communication message transmitted by that communication unit.

5. The system of claim 3, further including remote receiving sites for receiving communication messages from said communication units and transmitting them to said repeater.

6. In a communication system for communicating, on ate least one radio frequency channel, communication messages between at least two communication units through a repeater, wherein said repeater includes means for EXORing the communication messages received from each of said communication units to provide a combined communication message and means for transmitting the combined communication message to said communication units, a method for recovering communication messages by one communication unit comprising the steps of:
 (a) transmitting a binary communication message to said repeater;
 (b) receiving said combined communication message; and
 (c) recovering the communication message of the other communication unit by EXORing the combined communication message with the communication message transmitted from the communication unit.

7. In a communication system for communicating, on at least one radio frequency channel, communication messages between at least two communication units through a repeater, wherein said repeater includes means for EXORing communication messages received from each of said communication units to provide a combined communication message and means for transmitting the combined communication message to each of said communication units, said communication units comprising:
 means for transmitting a binary communication message to said repeater;
 means for receiving said combined communication message; and
 means for recovering the communication message of the other communication unit by EXORing the combined communication message with the communication message transmitted from the communication unit.

8. A method for communicating communication messages between at least two communication units through a repeater in a time division multiplexed communication system, wherein said system supports a plurality of time slots on at least one radio frequency communication channel, comprising steps of:
 (a) transmitting bianry communication messages from each of said two communication units to said repeater respectively during a first time slot and a second time slot;
 (b) EXORing said communication messages and transmitting a combined communication message from said repeater to said communication units during a third time slot;
 (c) receiving said combined communication message by at least one of said communication units; and
 (d) recovering the communication message of the other communication unit by EXORing the combined communication message with the communication message transmitted from the communication unit.

9. A time division multiplexed communication system for communicating communication messages between two communication units through a repeater, wherein said system supports a plurality of time slots on at least one radio frequency communication channel, comprising:
 means for transmitting binary communication messages from each of said communication units to said repeater respectively during a first and a second time slot;
 EXORing means for combining said communication messages in said repeater to provide a combined communication message;
 means for transmitting the combined communication message to said communication units during a third time slot;
 means for receiving said combined communication message in at least one of said two communication units; and
 means for recovering the communication message of the other communication unit by EXORing the combined communication message with the binary communication message transmitted from that communication unit.

10. The system of claim 9, further including remote receiving sites for receiving communication messages from said communication units and transmitting them to said repeater.

11. In a time division multiplexed communication system for communicating communication messages between two communication units through a repeater, wherein said system supports a plurality of time slots on at least one radio frequency communication channel, and wherein said repeater includes means for EXORing said received communication messages from each of said communication units during a first and a second time slot and means for transmitting a combined communication message to said communication units during a third time slot, a method for recovering communication messages by one communication unit comprising the steps of:

(a) transmitting binary communication messages to said repeater during one of said first or said second time slots;

(b) receiving said combined communication message during said third time interval; and (c) recovering the communication message of the other communication unit by EXORing the combined communication message with the binary communication message transmitted from that communication unit.

12. In a communication system for communicating communication messages between two communication units through a repeater, wherein said system supports a plurality of time slots on at least one radio frequency communication channel, and wherein said repeater includes means for EXORing received communication messages form each of said communication units during a first and a second time slot and means for transmitting a combined communication message to each of said communication units during a third time slot, said communication units comprising:

means for transmitting a binary communication message to said repeater during one of said first or said second time slots;

means for receiving said combined communication message during said third time slot; and means for recovering the communication message of the other communication unit by EXORing the combined communication message with the communication message transmitted from the communication unit.

* * * * *